United States Patent
Brantley

(10) Patent No.: US 7,721,008 B2
(45) Date of Patent: May 18, 2010

(54) METHOD OF CORRECTING CHANNEL CHANGE ERRORS IN A MEDIA CENTER PERSONAL COMPUTER SYSTEM

(75) Inventor: Matthew F. Brantley, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1246 days.

(21) Appl. No.: 11/251,953

(22) Filed: Oct. 17, 2005

(65) Prior Publication Data

US 2007/0089059 A1    Apr. 19, 2007

(51) Int. Cl.
*G06F 3/00* (2006.01)
(52) U.S. Cl. .................... 710/5; 348/14.05; 348/734; 348/735
(58) Field of Classification Search .................. None
See application file for complete search history.

(56) References Cited

U.S. PATENT DOCUMENTS

| | | | |
|---|---|---|---|
| 3,800,230 A * | 3/1974 | Marks et al. ............. | 455/181.1 |
| 6,397,288 B1 | 5/2002 | Rye et al. | |
| 6,870,579 B2 * | 3/2005 | Macrae et al. ............. | 348/731 |
| 2004/0025189 A1 | 2/2004 | Bauersachs et al. | |
| 2006/0010470 A1 * | 1/2006 | Kurosaki et al. ............. | 725/46 |

OTHER PUBLICATIONS

Hernandez et al., Master Control Lock Key for Input Devices in a Personal Computer/Television System, Nov. 1, 1997, IBM technical disclosure, TDB v40 n11 11-97, pp. 185-288.*

* cited by examiner

*Primary Examiner*—Eron J Sorrell

(57) ABSTRACT

A method corrects channel change errors in a media center personal computer system. The media center personal computer system has a personal computer coupled to an infrared (IR) remote control device and a tuner card coupled to an output of an external tuner. The method determines when channel change instructions have been sent from the IR remote control device to the external tuner. It then determines whether an output from the external tuner is changing and if not, resends the channel change instructions from the IR remote control device to the external tuner upon determining that the output from the external tuner is not changing.

20 Claims, 2 Drawing Sheets

METHOD OF CORRECTING CHANNEL CHANGE ERRORS IN A MEDIA CENTER PERSONAL COMPUTER SYSTEM

FIELD OF THE INVENTION

The present invention relates to media center personal computer applications, and more particularly, to a method of monitoring and correcting channel change errors in a media center PC application.

BACKGROUND OF THE INVENTION

Personal computers are increasingly being used to control external tuners, such as a satellite tuner, a cable set-top box, a television tuner, or the like, and record the output of these tuners. These personal computers are often known as media center personal computers (PCs) and the applications that run on them to control the external tuners and record their output are often known as media center PC applications. The PC can be programmed to tune the external tuner to a desired channel station and at a desired time. Typically, the external tuners are configured to responds to IR signals and the media center PC has one or more IR remote control device devices that transmits IR signals to one or more external tuners and one or more tuner cards to which the output(s) of the external tuner(s) is connected. In one typical media center PC configuration, the PC has an IR remote control device and tuner card for each external tuner. The IR signals transmitted by the IR remote control device include the appropriate command(s) to control the tuner, such as to change to a desired channel. For example, the IR signals include the digits of the channel to which the tuner is to change. Such personal computers often use the Windows Media Center software to run the media center application.

One problem that personal computers running media center applications using the Windows Media Center software have had is that in some cases, the tuner doesn't properly change channels when commanded to do so by the PC. For example, system delays during channel changing sometimes cause the external tuner not to receive proper channel information from the PC. For example, one or more digits of the channel may be dropped either due to the IR remote control device not properly transmitting the digits or the external tuner not properly receiving the digits. If this error causes the external tuner to tune to a channel that does not contain any video information, the media center PC will record a blank screen.

Heretofore, the solution to has been to slow down the transmission rate of the IR remote device. While this has proven effective for subsequent digits of the channel, it does not solve the problem when it is the first digit of the channel that is not properly sent by the PC or received by the external tuner.

SUMMARY OF THE INVENTION

A method in accordance with an embodiment of the invention corrects channel change errors in a media center personal computer system. The media center personal computer system has a personal computer coupled to an infrared (IR) remote control device and a tuner card coupled to an output of an external tuner. The method determines when channel change instructions have been sent from the IR remote control device to the external tuner. It then determines whether an output from the external tuner is changing and if not, resends the channel change instructions from the IR remote control device to the external tuner upon determining that the output from the external tuner is not changing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The method of the present invention addresses the problem of channel change errors in media center PCs running media center applications. The present invention may illustratively be implemented as an add-on software application 200 (FIG. 2) that is used to program the media center PC. This software application 200 may illustratively run in the background of the media center application running on the media center PC.

Figure 1:
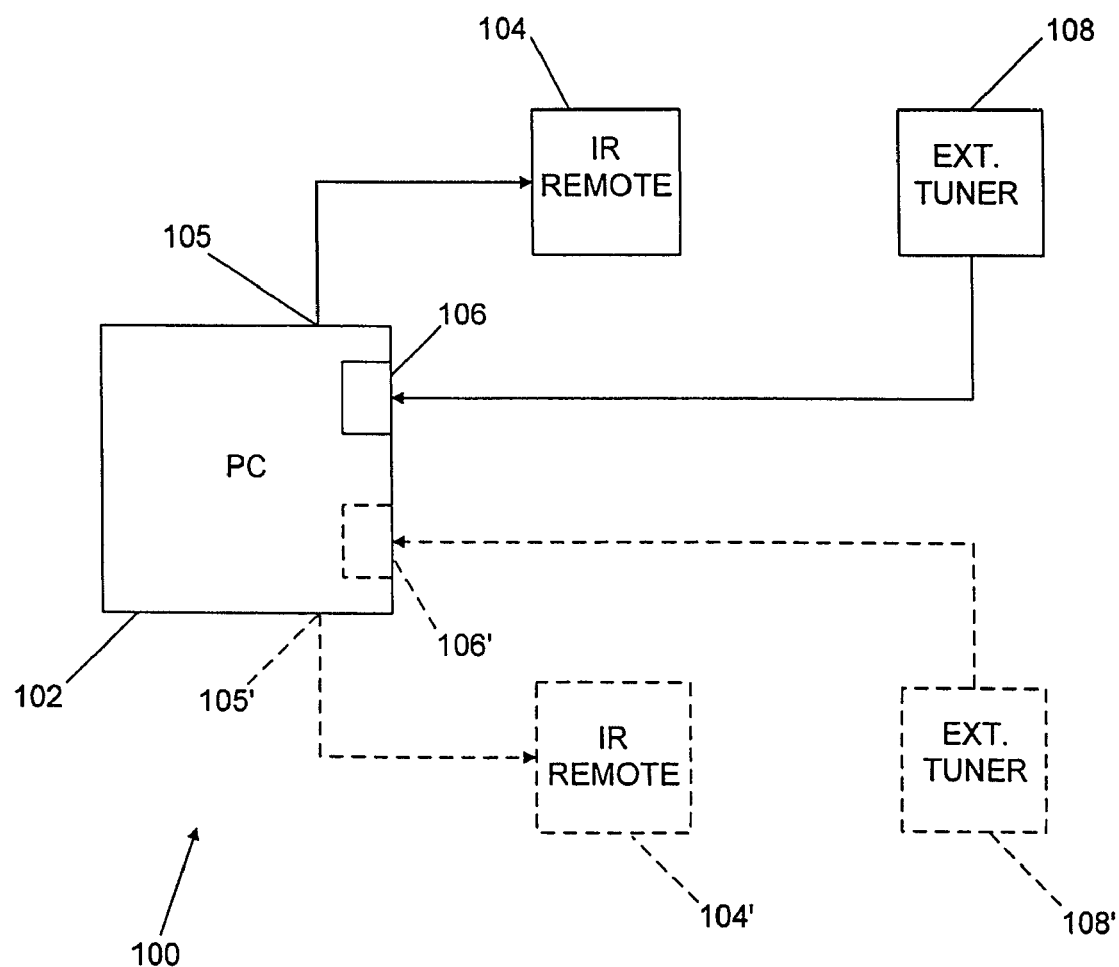
FIG. 1 is a block diagram of a media center personal computer system.

With reference FIG. 1, a media center PC system 100 includes a PC 102 having an IR remote control device 104 and a tuner card 106. IR remote control device 104 may be a card received in a card slot of PC 102, or may be an external device and connected to PC 102, such as to a USB port 105 of PC 102. An external tuner 108 is coupled to tuner card 106. External tuner 108 responds to infrared signals transmitted by IR remote control device 104. Media center PC system 100 may include multiple IR remote control devices 104 and tuner cards 106 for controlling multiple external tuners 108 and receiving outputs from multiple external tuners 108. A second IR remote control device 104' illustratively coupled to a second USB port 105' of PC102, tuner card 106' and external tuner 108' are shown in phantom in FIG. 1.

Figure 2:
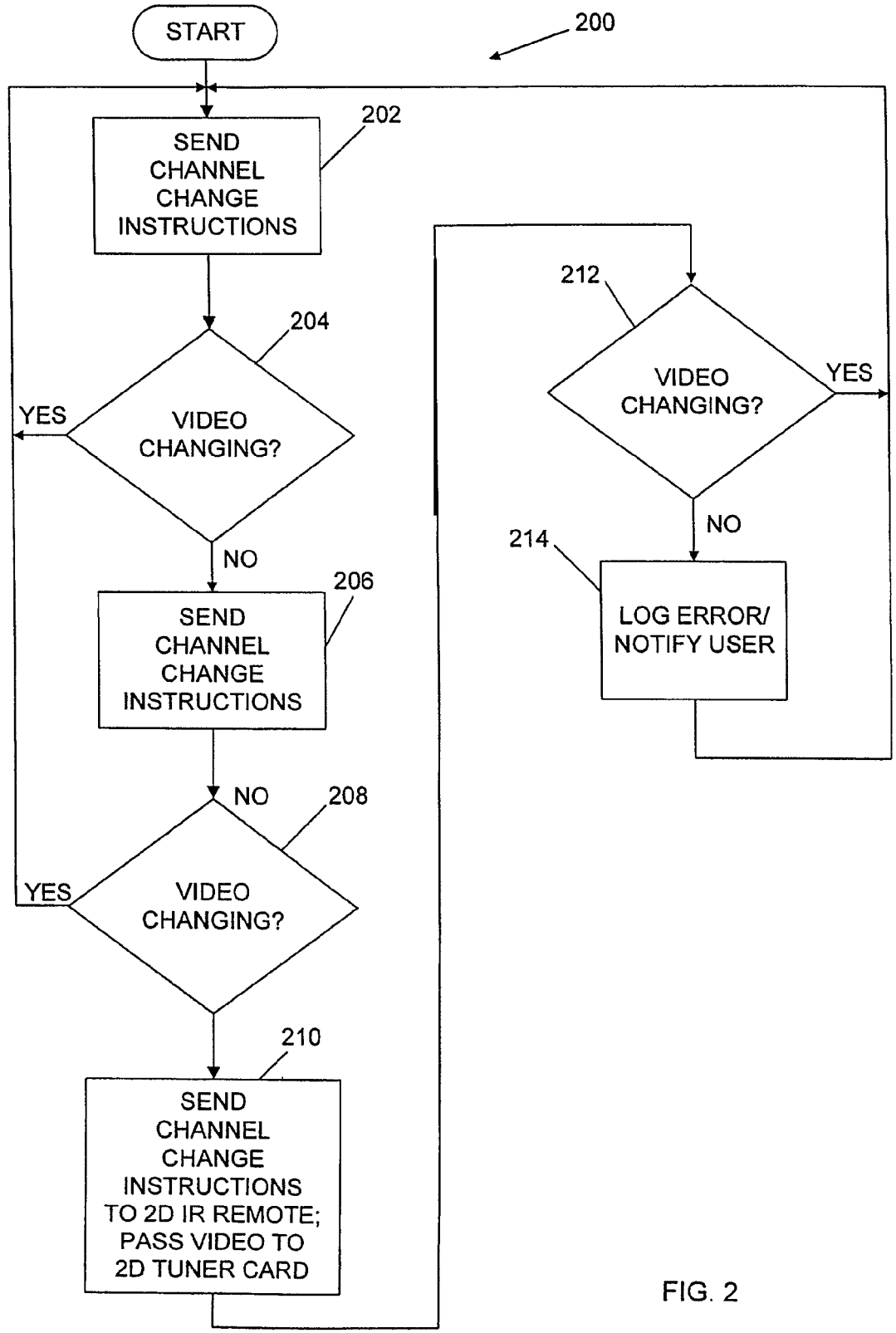
FIG. 2 is a flow chart of a channel change error correction method in accordance with the invention.

With reference to the flow chart of FIG. 2, application 200 monitors media center PC system 100 and determines at 202 when IR remote control device 104 sends IR signals to external tuner 108 to command external tuner 108 to change to a desired channel. When IR remote control device is an external device coupled to USB port 105 of PC 102 that only receives commands from PC 102 via USB port 105, application 200 determines that IR remote control device is sending IR signals to external tuner 108 PC 102 when PC 102 sends the appropriate commands to IR remote control device 104 via USB port 105. After a predetermined length of time to allow for the completion of the channel-change and for any screen menus to clear, application 200 checks at 204 whether the output from external tuner 108 is changing, illustratively by checking for any change in the output from tuner card 106. Illustratively, application 200 checks whether the video output of external tuner 108 is changing by checking whether the video output of tuner card 106 is changing. If the output from tuner card 106 is changing, application 200 returns to monitoring media center PC system 100 (at 202) to determine whether IR remote control 104 has sent command signals to external tuner 108. Similarly, it should be understood that application 200 could check whether the output of external tuner 108 is changing by checking whether the audio output of external tuner 108 is changing.

If the video signal from tuner card 106 is not changing, application 200 at 206 causes PC 102 to have IR remote control device 104 resend the channel change instructions to external tuner 108. After a predetermined length of time to allow for the completion of the channel-change and for any screen menus to clear, application 200 checks at 208 whether the video signal from external tuner 108 is changing, illustratively by checking for any change in the video output of tuner card 106. Illustratively, tuner card 106 includes a video capture card (as is conventional in many tuner cards) and the output of the video capture card provides the video output of tuner card 106. Application 200 illustratively checks for changing output of the video capture card of tuner card 106 to determine if the video output of tuner card 106 is changing. If the video output from tuner card 106 is changing, application 200 returns to monitoring media center PC system 100 (at 202) to determine whether IR remote control 104 has sent command signals to external tuner 108.

If the video output from tuner card 106 is still not changing, application 200 causes PC 102 to switch to a different IR remote control device 104, tuner card 106 and external tuner 108, if they are available. If so, second remote IR remote control device 104' sends at 210 the channel change instructions to second external tuner 108' and passes the video output from second tuner card 106' to the media center application. After a predetermined length of time to allow for the completion of the channel-change and for any screen menus to clear, application 200 checks at 212 whether the video output from tuner card 106' is changing. If the video output from tuner card 106' is changing, application 200 returns to monitoring media center PC system 100 (at 202) to determine whether IR remote control 104 has sent command signals to external tuner 108. If the video output from tuner card 106' is not changing, application 200 illustratively logs an error and/or notifies a user of the error at 214. Additionally, or alternatively, application 200 causes the second IR remote device 104', tuner card 106' and external tuner 108' to be retried or causes the first IR remote device 104, tuner card 106 and external tuner 108 to be retried.

The present invention advantageously provides a path of redundancy to a media center application. That is, if a first IR remote control device, tuner card 106 and external tuner 108 are determined to have failed, the present invention retries them and, if second IR remote control device 104', tuner card 106' and external tuner 108' are available, switches to them and retries using them. Application 200, which is illustratively a stand-alone software application that runs in the background of the media center application, can advantageously be installed on any appropriate configured media center PC.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of correcting channel change errors in a media center personal computer system having a personal computer coupled to an infrared (IR) remote control device and a tuner card coupled to an output of an external tuner, comprising:
 a. determining when channel change instructions have been sent from the IR remote control device to the external tuner;
 b. upon determining that channel change instructions have been sent, determining whether an output from the external tuner is changing, wherein determining whether the output of the external tuner is changing includes determining whether a video output of the tuner card to which the external tuner is coupled is changing; and
 c. resending the channel change instructions from the IR remote control device to the external tuner upon determining that the output from the external tuner is not changing.

2. The method of claim 1 further including determining whether the output from the external tuner is changing after resending the channel change instructions and upon determining that the output from the external tuner is not changing, sending channel change instructions from a second IR remote control device to a second external tuner.

3. The method of claim 2 further including determining whether an output from the second external tuner is changing after sending the channel change instructions to the second external tuner.

4. The method of claim 3 further including logging an error upon determining that the output from the second external tuner is not changing.

5. The method of claim 3 further including notifying a user of the media center person compute system that a channel change error has occurred upon determining that the output from the second external tuner is not changing.

6. The method of claim 3 further including resending the channel change instructions from the second IR remote control device to the second external tuner upon determining that the output from the second external tuner is not changing.

7. The method of claim 3 wherein determining whether the outputs of the external tuners are changing includes determining whether a video output of the tuner card to which the respective external tuner is coupled is changing.

8. The method of claim 1 further comprising transmitting output from the external tuner to the tuner card of the personal computing system.

9. A method of correcting channel change errors in a media center personal computer system having a personal computer coupled to an infrared (IR) remote control device and a tuner card coupled to an output of an external tuner, comprising:
 a. determining when channel change instructions have been sent from the IR remote control device to the external tuner;
 b. upon determining that channel change instructions have been sent, determining whether an output from the external tuner is changing; and
 c. resending the channel change instructions from the IR remote control device to the external tuner upon determining that the output from the external tuner is not changing; and
 d. determining whether the output from the external tuner is changing after resending the channel change instructions and upon determining that the output from the external tuner is not changing, sending channel change instructions from a second IR remote control device to a second external tuner.

10. The method of claim 9 further including determining whether an output from the second external tuner is changing after sending the channel change instructions to the second external tuner.

11. The method of claim 10 further including logging an error upon determining that the output from the second external tuner is not changing.

12. The method of claim 10 further including notifying a user of the media center person compute system that a channel change error has occurred upon determining that the output from the second external tuner is not changing.

13. The method of claim 10 further including resending the channel change instructions from the second IR remote control device to the second external tuner upon determining that the output from the second external tuner is not changing.

14. The method of claim 10 wherein determining whether the outputs of the external tuners are changing includes determining whether a video output of the tuner card to which the respective external tuner is coupled is changing.

15. The method of claim 9 wherein determining whether the output of the external tuner is changing includes determining whether a video output of the tuner card to which the external tuner is coupled is changing.

16. A media center personal computer system comprising:
   a first infrared (IR) remote control device;
   a personal computer coupled to the first infrared remote control device and having a first tuner card configured to receive output from a first tuner external to the personal computer, the personal computer having an application configured to:
   a. determine when a channel change instruction has been sent from the first IR remote control device to the first tuner external to the personal computer;
   b. upon determining that the channel change instruction have been sent, determining whether an output from the first tuner external to the personal computer is changing; and
   c. resend the channel change instruction from the first IR remote control device to the first tuner external to the personal computer upon determining that the output from the first tuner external to the personal computer is not changing.

17. The media center personal computer system of claim 16 further comprising a second infrared (IR) remote control device coupled to the personal computer;
   wherein the personal computer further comprises a second tuner card configured to receive output from a second tuner external to the personal computer; and
   wherein the application of the personal computer is further configured to determine whether the output from the first tuner external to the personal computer is changing after resending the channel change instruction and upon determining that the output from the first tuner external to the personal computer is not changing, sending the channel change instruction from the second IR remote control device to the second tuner external to the personal computer.

18. The media center personal computer system of claim 17, wherein the application is further configured to determine whether an output from the second tuner external to the personal computer is changing after sending the channel change instruction to the second external tuner.

19. The media center personal computer system of claim 17, wherein the application is further configured to determine whether the output from the second tuner external to the personal computer is changing after sending the channel change instruction from the second IR remote control device and upon determining that the output from the second tuner external to the personal computer is not changing, resending the channel change instruction from the first IR remote control device to the first tuner external to the personal computer.

20. The media center personal computer system of claim 16, wherein the application is further configured to determine whether the output of the first external tuner is changing includes determining whether an output of the first tuner card to which the first external tuner is coupled is changing.

* * * * *